United States Patent [19]

Koyama et al.

[11] Patent Number: 5,635,587
[45] Date of Patent: Jun. 3, 1997

[54] PROCESS FOR MANUFACTURING POLYARYLENE SULFIDE

[75] Inventors: Yoshinari Koyama; Norio Ogata; Hiroshi Nishitani, all of Ichihara, Japan

[73] Assignee: Idemitsu Petrochemical Co., Ltd., Tokyo, Japan

[21] Appl. No.: 357,405

[22] Filed: Dec. 16, 1994

[30] Foreign Application Priority Data

| Dec. 16, 1993 | [JP] | Japan | 5-343634 |
| Jan. 10, 1994 | [JP] | Japan | 6-012215 |
| Feb. 18, 1994 | [JP] | Japan | 6-044892 |
| Mar. 23, 1994 | [JP] | Japan | 6-076646 |

[51] Int. Cl.$^6$ .................................................. C08G 75/00
[52] U.S. Cl. .................................................. 528/381; 528/387
[58] Field of Search .................................................. 528/381, 387

[56] References Cited

U.S. PATENT DOCUMENTS

| 4,024,118 | 5/1977 | Campbell et al. | 528/388 |
| 4,373,090 | 2/1983 | Edmonds, Jr. | 528/387 |
| 4,451,643 | 5/1984 | Edmonds, Jr. et al. | 528/387 |
| 4,910,294 | 3/1990 | Ogata et al. | 528/388 |
| 5,110,901 | 5/1992 | Hoover et al. | 528/387 |
| 5,321,121 | 6/1994 | Yu et al. | 528/388 |

FOREIGN PATENT DOCUMENTS

| 0321881 | 6/1989 | European Pat. Off. . |
| 0346795 | 12/1989 | European Pat. Off. . |
| 0477964 | 4/1992 | European Pat. Off. . |

OTHER PUBLICATIONS

Patent Abstracts of Japan, vol. 11, No. 106 (C–414), Apr. 3, 1987, JP–61–254623, Nov. 12, 1986.

*Primary Examiner*—Mark D. Sweet
*Attorney, Agent, or Firm*—Oblon, Spivak, McClelland, Maier & Neustadt, P.C.

[57] ABSTRACT

A process for efficiently manufacturing high purity polyarylene sulfide. The process comprises feeding a liquid or gaseous sulfur compound (e.g. hydrogen sulfide) to a mixture comprising lithium hydroxide and a non-lithium hydroxide solid compound (e.g. alkali metal chloride or alkaline earth metal chloride) in a non-protonic organic solvent (e.g. N-methyl-2-pyrrolidone), separating the alkali metal chloride or alkaline earth metal chloride, adjusting the sulfur content of the reaction mixture, feeding a dihalogeno aromatic compound e.g. p-dichlorobenzene) to effect a polycondensation reaction, and adding of an alkali metal hydroxide (e.g. sodium hydroxide) to recover lithium ion.

11 Claims, 1 Drawing Sheet

PROCESS FOR MANUFACTURING POLYARYLENE SULFIDE

BACKGROUND OF THE INVENTION

1. Field of the Invention

The present invention relates to a process for manufacturing polyarylene sulfide, and, more particularly, to a process for manufacturing high quality polyarylene sulfide, useful as a material for electrical or electronic parts and appliances and as a high rigidity material, at a low cost.

The present invention further relates to a process for separating a solid compound other than lithium hydroxide (such a solid compound is hereinafter referred to as non-lithium hydroxide solid compound), and, in particular, to a process for efficiently separating a non-lithium hydroxide solid compound produced in the process for manufacturing polyarylene sulfide.

Furthermore, the present invention relates to a process for recovering lithium ion, and, in particular, to a process for efficiently recovering lithium ion from a reaction mixture of polyarylene sulfide containing lithium chloride in the process for manufacturing polyarylene sulfide.

2. Description of the Background Art

Polyarylene sulfide resins (PAS resins), in particular, polyphenylene sulfide resins (PPS resins), are known as engineering plastics having excellent mechanical strength, heat resistance, and especially high rigidity. They are useful materials for electrical and electronic parts and appliances, and as high rigidity materials for various applications. A conventional process for manufacturing these resins is reacting a dihalogeno aromatic compound such as p-dichlorobenzene and a sodium salt such as sodium sulfide in a non-protonic organic solvent such as N-methyl-2-pyrrolidone (hereinafter abbreviated from time to time as MMP). A problem in this process resides in the difficulty in removing by-produced sodium chloride from resins by washing, since sodium chloride is insoluble in the solvents such as NMP and is incorporated in the resins. A process using a lithium salt instead of the sodium salt is attracting attention as a process for overcoming this problem. Because lithium chloride produced as a side product in the polymerization reaction is soluble in many of the non-protonic organic solvents such as NMP, it is possible to comparatively easily reduce the lithium content in the resin.

In order to reduce the manufacturing cost of the resins, however, it is essential to recover and reuse lithium which is far more expensive than sodium.

As a process for manufacturing polyarylene sulfide resins, including polyphenylene sulfide resins, using the lithium salt, U.S. Pat. No. 4,451,643 discloses a batch or continuous process for manufacturing these resins by reacting lithium N-methylaminobutyrate (hereinafter abbreviated from time to time as LMAB), produced by the reaction of lithium hydroxide and NMP, a dihalogeno aromatic compound, such as p-dichlorobenzene, and hydrogen sulfide. In this process, polymers such as PPS resins are synthesized using LMAB, which is a lithium salt but not a sodium salt, as a polymerization raw material, whereby lithium chloride which is soluble in NMP solvent is produced as a side product. Because of this, the amount of alkali metal components incorporated in the polymers is greatly reduced as compared with the conventional process wherein sodium chloride which is insoluble in the solvent is produced as a side product. Nevertheless, this process has a drawback in that LMBA must be first produced by the reaction of lithium hydroxide (LiOH·H$_2$O) and NMP.

Moreover, because this process uses lithium hydroxide as a starting raw material, lithium chloride produced as a side product by the polymerization reaction must be regenerated into lithium hydroxide for recovering and reuse of this compound. As a method for collecting lithium chloride and converting it into lithium hydroxide, U.S. Pat. No. 4,451,643 proposes a method of washing the reaction products and the polymers with water to collect lithium chloride as an aqueous solution, and reacting the lithium chloride with sodium hydrogen carbonate or subjecting the aqueous solution to electrolysis to convert the lithium chloride into lithium hydroxide. The method of using sodium hydrogen carbonate requires a complicated process wherein lithium chloride is first converted to lithium carbonate and then to lithium hydroxide. The electrolysis is disadvantageous in view of production cost and is not industrially viable.

The process proposed by U.S. Pat. No. 4,451,643 requires a step for producing lithium N-methyl-aminobutyrate from lithium hydroxide and N-methyl-2-pyrrolidone, wherein a large quantity of water is required for preventing a retarded reaction which takes place when the amount of water is small. This is another drawback which makes the process industrially less attractive.

Japanese Patent Application Laid-open (kokai) No. 180928/1990 discloses a process for manufacturing high polymeric PAS, wherein a mixture of an organic polar solvent, sodium hydroxide hydrate, and alkali metal aminocarboxylate is dehydrated by distillation or the like, and the dehydrated mixture is mixed and reacted with lithium halogenide and a dihalogeno aromatic compound. This process was proposed in order to overcome the difficulty in removing crystal water contained in alkali metal sulfide which was used in a process for manufacturing PAS.

However, the mixture to be dehydrated in this process is a slurry which involves a problem when it is subjected to continuous distillation while heating. Although there are no problems when the slurry is treated by batch distillation, in the continuous distillation, the mixture is continuously sent to a distillation column whereby components are separated by boiling point differences among them, removing vapor from the top. Solid components in the slurry may stay and accumulate in column trays, choke up the trays, and bring the distillation column inoperative.

In a process for separating a non-lithium hydroxide solid compound such as alkali metal chloride from a mixture containing lithium hydroxide and the non-lithium hydroxide solid compound in N-methylpyrrolidone, a method of feeding water to the system to separate the alkali metal chloride from lithium hydroxide by the utilization of difference in the solubility in water between the two components has been commonly adopted. However, the separation efficiency of this method was extremely poor, because the difference in the solubility in water between lithium hydroxide and alkali metal chloride is small. Another method which has been adopted is feeding water to the system and heating the mixture to convert the lithium hydroxide into lithium N-methylaminobutyrate which is soluble in N-methylpyrrolidone. Alkali metal chloride existing as a solid is then separated. This method has problems in that the procedure is complicated and a large quantity of water is left in the system. Further, lithium hydroxide cannot be separated efficiently if the mixture contains polyarylene sulfide oligomers and the like in addition to alkali metal chloride.

The present invention has been achieved in order to solve the above problems, and has an object of providing an efficient and simple process for manufacturing polyarylene sulfide containing only a slight amount of alkali metal chloride and the like as impurities and having high quality, whereby recover and reuse of lithium is possible.

Another object of the present invention is to provide a process for manufacturing high polymeric and high quality polyarylene sulfide, wherein the reaction mixture can be dehydrated by continuous distillation while preventing the distillation column trays from being choked up.

Still another object of the present invention is to provide a process for efficiently separating a non-lithium hydroxide solid compound such as alkali metal chloride from a mixture containing lithium hydroxide and the non-lithium hydroxide solid compound in a non-protonic organic solvent.

A further object of the present invention is to provide a process for recovering lithium ion from lithium chloride produced in a process for manufacturing polyarylene sulfide.

SUMMARY OF THE INVENTION

The above objects can be solved according to the present invention by a process (I) for manufacturing polyarylene sulfide comprising, (a) a step of feeding a liquid or gaseous sulfur compound to a mixture comprising lithium hydroxide and a non-lithium hydroxide solid compound in a non-protonic organic solvent, and directly reacting lithium hydroxide and the sulfur compound, (b) a step of separating the non-lithium hydroxide solid compound, (c) a step of adjusting the sulfur content of the reaction mixture, (d) a step of feeding a dihalogeno aromatic compound to effect a polycondensation reaction, and (e) a step of feeding an alkali metal hydroxide or an alkaline earth metal hydroxide to the reaction mixture which contains by-produced lithium chloride and reacting lithium ion and hydroxy ion to recover lithium ion as lithium hydroxide which is the reaction product.

According to this process, lithium hydroxide and a sulfur compound can be directly reacted by feeding a liquid or gaseous sulfur compound, for example hydrogen sulfide, to a mixture containing lithium hydroxide and a non-lithium hydroxide solid compound, such as an alkali metal chloride or an alkaline earth metal chloride, in a non-protonic organic solvent, such as N-methyl-2-pyrrolidone. Lithium hydroxide is solubilized by this reaction and the non-lithium hydroxide solid compound can be separated and removed efficiently. Furthermore, because the non-lithium hydroxide solid compound, for example alkali metal chloride or alkaline earth metal chloride, can be efficiently separated, the residual amount of impurities such as alkali metals in the polyarylene sulfide resins obtained by the polymerization of a dichloro aromatic compound can be reduced. Thus, polyarylene sulfide resins possessing excellent electrical characteristics can be obtained. Problems such as corrosion of molding dies due to residual alkali metals can be also eliminated. In addition, lithium ion can be recovered for reuse. The process is thus simple and efficient.

The above objects can be further solved according to the present invention by a process (II) for manufacturing polyarylene sulfide comprising, (a) a step of feeding a liquid or gaseous sulfur compound to a system comprising lithium hydroxide (LiOH) and lithium N-methylaminobutyrate (LMBA) in a non-protonic organic solvent, (b) a step of dehydrating the resulting reaction mixture, and (c) a step of adjusting the sulfur content of the reaction mixture and feeding a dihalogeno aromatic compound to effect a polycondensation reaction.

This process can prevent the distillation trays from being choked up when the reaction mixture is dehydrated by distillation, thereby enabling the dehydration procedure to be continuously conducted.

The above object of separating a non-lithium hydroxide solid compound can be solved according to the present invention by a method (III) for separating a non-lithium hydroxide solid compound from a mixture comprising lithium hydroxide and the non-lithium hydroxide solid compound in N-methylpyrrolidone, characterized by feeding a liquid or gaseous sulfur compound to said mixture.

The non-lithium hydroxide solid compound can be efficiently separated and removed by this process.

The above object of recovering lithium ion from a reaction mixture of polyarylene sulfide which contains lithium chloride can be solved according to the present invention by a process (IV) for recovering lithium ion comprising, feeding an alkali metal hydroxide or an alkaline earth metal hydroxide to said reaction mixture of polyarylene sulfide containing lithium chloride, reacting lithium ion and hydroxy ion, and recovering the lithium ion as lithium hydroxide which is the reaction product.

Lithium ion can be efficiently recovered from the lithium chloride contained in the reaction mixture of polyarylene sulfide by this process.

These and other objects, features, and advantages of the present invention will become more apparent from the following description of the preferred embodiments.

Figure 1:
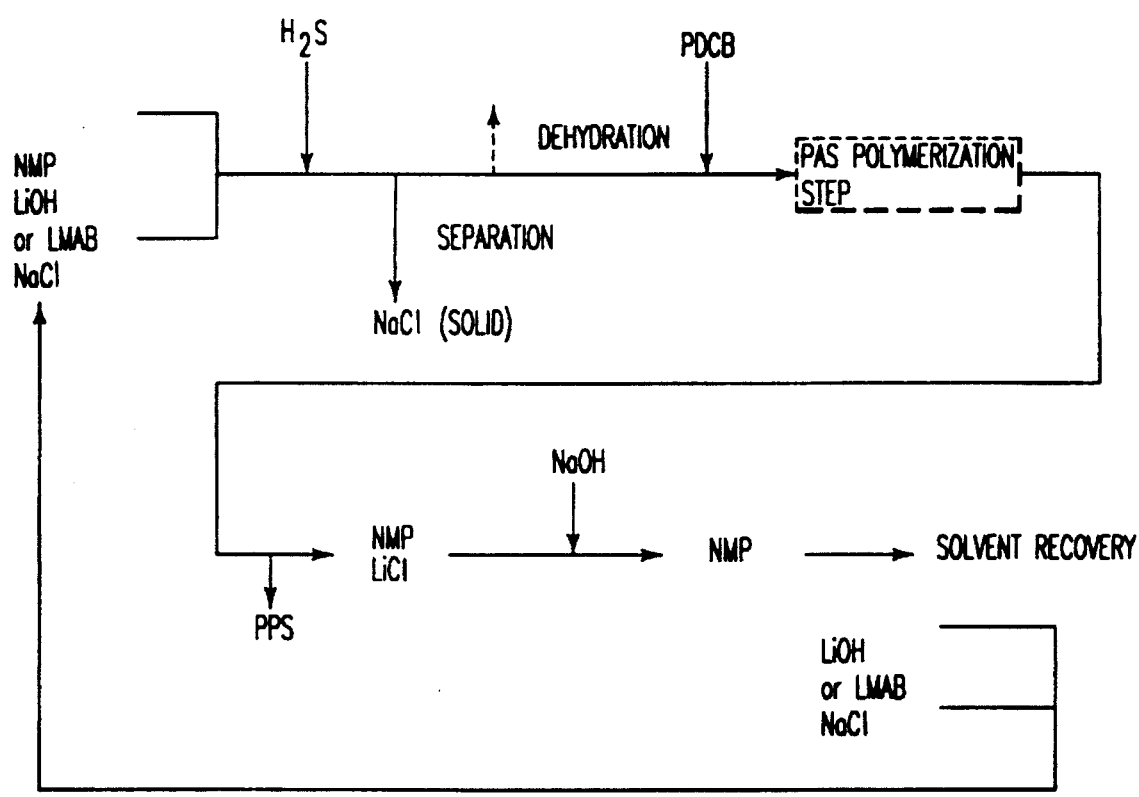
FIG. 1 is a drawing schematically illustrating the process for manufacturing polyarylene sulfide of the present invention.

DETAILED DESCRIPTION OF THE INVENTION AND PREFERRED EMBODIMENTS (I) Process for manufacturing polyarylene sulfide Each step of the process for manufacturing polyarylene sulfide of the present invention will be specifically illustrated.

1. Feeding of a sulfur compound (step (a))

In the present invention, a liquid or gaseous sulfur compound is first fed to, for example hydrogen sulfide is bubbled into, a mixture comprising lithium hydroxide and a non-lithium hydroxide solid compound, for example alkali metal chloride or alkaline earth metal chloride, in a non-protonic organic solvent such as N-methyl-2-pyrrolidone, to react lithium hydroxide directly with the sulfur compound.

As the non-protonic organic solvent, a common non-protonic polar organic solvent, such as an amide compound, a lactam compound, a urea compound, an organic sulfur compound, or a cyclic organic phosphorus compound, can be preferably used either alone or in admixture.

Given as examples of the amide compound among the non-protonic polar organic solvents are N,N-dimethylformamide, N,N-diethylformamide, N,N-dimethylacetamide, N,N-diethylacetamide, N,N-dipropylacetamide, and N,N-dimethylbenzamide.

Examples of the lactam compound include N-alkyl caprolactams, such as caprolactam, N-methylcaprolactam, N-ethylcaprolactam, N-isopropylcaprolactam, N-isobutylcaprolactam, N-n-propylcaprolactam, N-n-butylcaprolactam, and N-cyclohexylcaprolactam; N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethyl-2-piperidone, and the like.

Given as examples of the urea compound are tetramethyl urea, N,N'-dimethylethylene urea, and N,N'-dimethylpropylene urea.

Included in examples of the sulfur compound are dimethylsulfoxide, diethylsulfoxide, diphenylsulfone, 1-methyl-1-oxosulforane, and 1-ethyl-1-oxosulforane, 1-phenyl-1-oxosulforane; of the cyclic organic phosphorus compound are 1-methyl-1-oxophosphorane, 1-n-propyl-1-oxophosphorane, and 1-phenyl-1-oxophosphorane. These non-protonic polar organic solvents can be used either alone or in admixture of two or more of them. Further, it is possible to use these non-protonic polar organic solvents in admixture with other solvents which do not affect the object of the present invention.

Of these non-protonic polar organic solvents, N-alkyl caprolactams and N-alkyl-2-pyrrolidone are preferred, with a particularly preferred solvent being N-methyl-2-pyrrolidone.

The non-lithium hydroxide solid compound used in the present invention means any solid compounds other than lithium hydroxide, for example, alkali metal chloride, alkaline earth metal chloride, or the like. Included in the separated non-lithium hydroxide solid compounds are solid matters which do not contain lithium hydroxide at all and those containing a slight amount of lithium hydroxide. Polyarylene sulfide oligomers can be given as specific examples of such non-lithium hydroxide solid compounds other than the alkali metal chloride or alkaline earth metal chloride. Examples of the alkali metal chloride or alkaline earth metal chloride include, but not limited to, sodium chloride, potassium chloride, magnesium chloride, and barium chloride. The temperature at which the liquid or gaseous sulfur compound is fed is usually lower than 170° C., preferably lower than 150° C., and more preferably lower than 130° C. If the temperature is 150° C. or higher, solid sulfides may be produced and it may be difficult to separate only non-lithium hydroxide solid compounds. The amount of the liquid or gaseous sulfur compound to be fed is preferably in the range of ½ to 2 mols, as sulfur, per lithium hydroxide. If this amount is less than ½ mol, a portion of lithium hydroxide may remain as solid and may not completely be separated from the non-lithium hydroxide solid compounds. The recovery efficiency of lithium will be poor. If the amount of the sulfur is more than 2 mols per lithium hydroxide, the reaction reaches saturation and the excess amount of the liquid or gaseous sulfur compound will be lost. In addition, feeding of an excess amount should be avoided, because liquid or gaseous sulfur compounds are noxious in many cases.

Hydrogen sulfide is preferably used in the present invention, although there are no specific limitations to the kind of the liquid or gaseous sulfur compound. In the case where hydrogen sulfide is used, it may be bubbled either at normal pressure or under pressure. Although there are no specific limitations to the period of time for which the hydrogen sulfide is bubbled, normally a period of about 10–180 minutes is preferable. There are no specific limitations also to the feed rate, with a preferred range being about 10–1000 cc/min. There are also no specific limitations to the method by which the hydrogen sulfide is bubbled. It is possible to use commonly employed methods, for example to bubble gaseous hydrogen sulfide into a mixture containing lithium hydroxide and alkali metal chloride or alkaline earth metal chloride in N-methyl-2-pyrrolidone, in a 500 ml of a separable flask made of glass while stirring at 300–700 rpm using a disk turbine blade as a stirrer. In this instance water may be present in the mixture.

2. Separation of non-lithium hydroxide solid compound (step (b))

Lithium hydroxide which have been present as a solid in the system is dissolved in the liquid layer by feeding a liquid or gaseous sulfur compound in this manner, leaving in the system only non-lithium hydroxide solid compounds as solid components.

For separating the non-lithium hydroxide solid compounds, for example, alkali metal chloride or alkaline earth metal chloride, remained in the mixture, a commonly known method such as filtration using glass filter G4 or centrifuge can be employed. The filtration may be carried out under reduced pressure. A temperature in the range of 20°–150° C. is usually preferable for the separation, although there are no specific limitations.

3. Adjustment of sulfur content (step (c))

In this step, the sulfur content in the reaction mixture obtained in the step (b) is adjusted by a desulfurization procedure, for example, a hydrogen sulfide removing procedure.

In order to carry out the reaction of dichloro aromatic compound hereinafter described, it is desirable to reduce the sulfur/lithium ratio (atomic molar ratio) to less than ½, and more desirably to control the sulfur/lithium ratio at ½. If this ratio is larger than ½, it is difficult to produce polyarylene sulfide because the reaction is difficult to proceed. There are no specific restrictions to the method of control. For example, it is possible to adjust the total sulfur content in the system by removing the sulfur compound, such as hydrogen sulfide, bubbled for separating the alkali metal chloride or alkaline earth metal chloride by bubbling nitrogen to the liquid portion of the system after the removal of the alkali metal chloride or alkaline earth metal chloride. In this instance, the mixture may be heated. It is also possible to control the sulfur/lithium ratio by adding a lithium compound such as lithium hydroxide and lithium N-methylamino-butyrate (LMAB).

4. Polycondensation, post-treatment (step (d))

After separating the non-lithium hydroxide solid compounds, such as alkali metal chloride or alkaline earth metal chloride, a dichloro aromatic compound is charged and reacted to produce polyarylene sulfide.

There are no specific limitations to the dichloro aromatic compound used in the present invention. A feed containing p-dichlorobenzene at a molar concentration of 50% or more is preferably used.

A one 1 autoclave (equipped with a paddle blade, 300–700 rpm) made of stainless steel, for example, can be used preferably as a reaction vessel. A reaction temperature of 220°–260° C. is applied preferably to the reaction, with a preferable reaction time being in the range of 1–6 hours. The molar ratio of the dichloro aromatic compound and sulfur existing in the system is preferably 0.9–1.2, and more preferably 0.95–1.05.

A commonly used method of the post-treatment is applicable. For example, the precipitated product obtained after cooling is separated by centrifuge or filtration, and the polymer obtained is purified by repeated washing with an organic solvent, water, or the like under heating or at room temperature. The washing of the polymer may be carried out in the solid state. Alternatively, a so-called melt-washing can be applied to the polymer in the state of liquid.

5. Recovery of lithium ion (production of LiOH, step (e))

In order to collect lithium ion contained as LiCl in the polyarylene sulfide reaction mixture, an alkali metal hydroxide or alkaline earth metal hydroxide, for example, sodium hydroxide, potassium hydroxide, or magnesium hydroxide, is charged to the mixture. Of these, sodium hydroxide is preferred. The amount of the alkali metal hydroxide or alkaline earth metal hydroxide to be charged is such that the hydroxy group contained therein is 0.90–1.1 mol, preferably 0.95–1.05 mol, per 1 mol of lithium ion. If this amount is more than 1.1 mol, the purity of polyarylene sulfide is decreased depending on the succeeding procedure. If this amount is smaller than 0.90 mol, some amount of lithium is lost. In this instance, although there are no specific limitations, the reaction temperature is usually from room temperature to 230° C., preferably 65°–150° C., when the alkali metal hydroxide or alkaline earth metal hydroxide is charged as an aqueous solution. If it is charged as a solid, the reaction temperature is usually 60°–230° C., and preferably 90°–150° C. In the case where the reaction temperature is low, the solubility is low and the reaction is retarded. If the reaction temperature is high, e.g., higher than the boiling point of NMP, the reaction must be carried out under pressure, and is thus industrially disadvantageous. There are no specific limitations to the reaction time.

(II) Process for manufacturing polyarylene sulfide

Each step of the process for manufacturing polyarylene sulfide (II) of the present invention will be specifically illustrated.

1. A step of feeding of a liquid or gaseous sulfur compound to the system where a non-protonic organic solvent and lithium hydroxide (LiOH) or LMAB are present (a).

(1) The non-protonic organic solvent

The solvents given in the description of said process (I) can be used as the non-protonic organic solvent used in this step.

(2) Preparation of a system where LiOH or LMAB is present

The system where a non-protonic organic solvent, lithium hydroxide (LiOH) or lithium N-methylaminobutyrate (LMAB) is present means the system obtained by feeding sodium hydroxide (NaOH) to a system where lithium chloride (LiCl) and a non-protonic organic solvent are present or a system where lithium chloride, a non-protonic organic solvent, and water are present. The method for preparing this system is specifically described.

(i) System where LiOH is present

In order to collect lithium ion contained as LiCl in the reaction mixture, an alkali metal hydroxide or alkaline earth metal hydroxide, for example, sodium hydroxide, potassium hydroxide, or magnesium hydroxide, is charged to the mixture. Of these, sodium hydroxide is preferred. The amount of the alkali metal hydroxide or alkaline earth metal hydroxide to be charged is such that the hydroxy group contained therein is 0.90–1.1 mol, preferably 0.95–1.05 mol, per 1 mol of lithium ion. If this amount is more than 1.1 mol, the purity of polyarylene sulfide is decreased depending on the succeeding procedure. If this amount is smaller than 0.90 mol, some amount of lithium is lost. In this instance, although there are no specific limitations, the reaction temperature is usually from room temperature to 230° C., preferably 65°–150° C., when the alkali metal hydroxide or alkaline earth metal hydroxide is charged as an aqueous solution. If it is charged as a solid, the reaction temperature is usually 60°–230° C., and preferably 90°–150° C. In the case where the reaction temperature is low, the solubility is low and the reaction is retarded. If the reaction temperature is high, e.g., higher than the boiling point of NMP, the reaction must be carried out under pressure, and is thus industrially disadvantageous. There are no specific limitations to the reaction time.

(ii) System where LMAB is present

In this case, the reaction is carried out in a mixed solvent of the non-protonic organic solvent and water, because lithium chloride and alkali metal hydroxide other than lithium hydroxide (non-lithium compound) are reacted while charging the non-lithium alkali metal hydroxide as an aqueous solution.

As the non-lithium alkali metal hydroxide, sodium hydroxide, potassium hydroxide, rubidium hydroxide, and cesium hydroxide can be used either alone or in admixture of two or more. Of these, sodium hydroxide and potassium hydroxide are preferred, with especially preferred hydroxide being sodium hydroxide. These non-lithium alkali metal hydroxide, including sodium hydroxide, are not necessarily limited to a pure compound. Commonly used industrial grade compounds can be preferably used.

When NMP and NaOH are used as the non-protonic organic solvent and the non-lithium alkali metal hydroxide, respectively, the molar ratio of NMP:NaOH is 1.05–30, and preferably 1.20–6.0; the molar ratio of LiCl:NaOH is 1.00–5, and preferably 1.00–1.5; and the molar ratio of water:NMP is 1.6–16, and preferably 2.8–8.3. The reaction temperature is usually 80°–200° C. and the reaction time is preferably about 0.1–10 hours.

(3) Feeding of a liquid or gaseous sulfur

The methods described for step (a) and step (b) of Process (I) are applicable to the feeding of the liquid or gaseous sulfur in this process.

2. Dehydration step (b)

There are no specific limitations as to the dehydration procedure used in the present invention. The following procedure is given as an example.

(1) Temperature

The temperature is determined depending on the vapor-liquid equilibrium of NMP and water. Usually, 130°–205° C. is preferable, but a temperature lower than 130° C. is acceptable if nitrogen ($N_2$) is bubbled at the same time. An even lower temperature is possible if the dehydration is carried out under reduced pressure.

(2) Allowable range of the water content

Moles of water equivalent to absorbed hydrogen sulfide is generated. It is desirable to dehydrate to a degree as much as possible in order to produce high polymeric polyarylene sulfide.

(3) Timing

Dehydration can be carried out at any time before feeding p-dichlorobenzene (PDCB)o Dehydration at the time of the hydrogen sulfide bubbling procedure is preferable in view of reducing the number of apparatus needed for the unit operation and the like.

3. A step of polycondensation by feeding dihalogen aromatic compound (c)

The methods described for step (c) and step (d) of Process (I) are applicable to the polycondensation in this process.

(III) Separation of the non-lithium hydroxide solid compounds

The method of step (b) and step (c) in the above-described Process (I) can be used as the method for separating the non-lithium hydroxide solid compounds (III).

(IV) Process for recovering lithium ion

The process for recovering lithium ion (IV) of the present invention will be specifically illustrated.

1. A polyarylene sulfide reaction mixture containing lithium chloride

There are no limitations as to the polyarylene sulfide reaction mixture used in Process (IV) for recovering lithium ion of the present invention. Polyarylene sulfide produced by any process is applicable, inasmuch as the same contains lithium chloride. The term "polyarylene sulfide reaction mixture" as used in the present invention means any reaction mixture obtained after separation of polyarylene sulfide from a mixture obtained by the reaction for forming polyarylene sulfide. The method of separation may be any commonly used separation method (e.g., solid-liquid separation, liquid-liquid separation).

Given as an example of the process for manufacturing polyarylene sulfide other than the Process (I) or Process (II) is the process described in U.S. Pat. 4,451,634, wherein lithium hydroxide and N-methyl-2-pyrrolidone (NMP) are reacted to produce lithium N-methylaminobutyrate (LMAB), and then a dihalogeno aromatic compound such as p-dichlorobenzene and a sulfur source such as hydrogen sulfide are reacted.

2. Alkali metal hydroxide or alkaline earth metal hydroxide

There are no specific limitations as to the alkali metal hydroxide or alkaline earth metal hydroxide used in this Process (IV). The examples which can be given are sodium hydroxide, potassium hydroxide, and magnesium hydroxide. Of these, sodium hydroxide which is a commercially available inexpensive industrial product is preferred.

3. Method of feeding the alkali metal hydroxide or alkaline earth metal hydroxide There are no specific limitations as to the method of feeding the alkali metal hydroxide or alkaline earth metal hydroxide used in this Process (IV). A commonly used industrial method, for example, blending the alkali metal hydroxide or alkaline earth metal hydroxide in a state of aqueous solution or solid in a tank or line, is applicable.

The amount of the alkali metal hydroxide or alkaline earth metal hydroxide to be charged is such that the hydroxy ion contained therein is 0.90–1.1 mol, preferably 0.95–1.05 mol, per 1 mol of lithium ion. If this amount is more than 1.1 mol, the unit consumption of the alkali metal or alkaline earth metal hydroxide may increase and the purity of polyarylene sulfide may be decreased depending on the succeeding procedure, although there are no adverse effects on the production of lithium hydroxide. If this amount is smaller than 0.90 mol, some lithium may remain as dissolved as the chloride, leading to loss of lithium.

4. Reaction conditions of lithium ion and hydroxide ion

Although there are no specific limitations to the conditions under which lithium ion and hydroxide ion are reacted, the reaction temperature is usually 0°–230° C., preferably 65°–150° C., when the alkali metal hydroxide or alkaline earth metal hydroxide is charged as an aqueous solution. If it is charged as a solid, the reaction temperature is usually 60–°230° C., and preferably 90°–150° C. In the case where the reaction temperature is low, the solubility is low and the reaction is unduly retarded. If the reaction temperature is high, e.g., higher than the boiling point of NMP, the reaction must be carried out under pressure, and is thus industrially disadvantageous. There are no specific limitations to the reaction time.

5. Recovery of lithium ion

Although it is possible to recover lithium ion as solid lithium hydroxide, recovering it as a lithium hydroxide solution for feeding to the next step is more desirable for continuously producing polyarylene sulfide. That is to say, if a liquid or gaseous sulfur compound is fed to a non-protonic organic solvent containing solid lithium hydroxide, alkali metal chloride or alkaline earth metal chloride, lithium hydroxide becomes soluble in the non-protonic organic solvent, thus enabling the alkali metal chloride or alkaline earth metal chloride which is insoluble in the solvent to be separated or removed by solid-liquid separation. The mother liquor is then sent to the next step of the process for manufacturing polyarylene sulfide as is.

Japanese Patent Applications No. 343634/1993 filed on Dec. 16, 1993, No. 012215/1994 filed on Jan. 10, 1994, 044892/1994 filed on Feb. 18, 1994, and No. 076646/1994 filed on Mar. 23, 1994 are herein incorporated as a reference.

Other features of the invention will become apparent in the course of the following description of the exemplary embodiments which are given for illustration of the invention and are not intended to be limiting thereof.

EXAMPLES

Example 1

(1) Hydrogen sulfide bubbling step 415.94 g (4.2 mol) of N-methyl-2-pyrrolidone, 123.5 g of a mixture of LiOH and NaCl (1.5 mol each), and 27.0 g (1.5 mol) of deionized water was placed in a 500 ml separable flask equipped with a stirring blade. The mixture was heated to 130° C., whereupon hydrogen sulfide was bubbled at a rate of 700 ml/min for 35 minutes, while controlling the temperature at 130° C. all the time. The feeding of hydrogen sulfide was terminated and sulfur was quantitatively analyzed to find that the quantity absorbed was 0.975 mol. The molar ratio S:Li was thus found to be 0.65. The iodometric method using iodine and sodium thiosulfate (a method of adding a diluted hydrochloric acid solution to the sample and further adding a surplus amount of an iodine solution, and then measuring an excess amount of iodine solution using a sodium thiosulfate standard solution by reverse titration) was used for the quantitative analysis of the sulfur in the mixture.

(2) NaCl separation step

The solution in which hydrogen sulfide was absorbed was filtered under reduced pressure through glass filter which was warmed at 130° C. The residue on the filter was washed with a large quantity of N-methyl-2-pyrrolidone at 130° C. and dried at 150° C. under reduced pressure to obtain 87.4 g of a solid dry product. The results of X ray diffractiometry revealed that the spectrum of this product was the same as that of NaCl, with no spectrum of LiOH.

The above results demonstrated that bubbling of hydrogen sulfide to a mixture of LiOH and NaCl effected the reaction only of LiOH and synthesized a complex which is soluble in N-methyl-2-pyrrolidone, thereby enabling NaCl to be separated.

(3) Sulfur content adjustment step

On the other hand, 400.0 g of the filtrate in which hydrogen sulfide was absorbed was transferred to a separable flask with the same volume as that used above and heated to 150° C., whereupon $N_2$ was bubbled at a rate of 700 ml/min until the ratio of S:Li became 0.50, thereby removing excessively absorbed hydrogen sulfide. The ratio of S:Li=0.50 was reached in 70 minutes while bubbling $N_2$.

(4) Polycondensation—post-treatment step

The liquid obtained above was transferred to a 1 l stainless steel autoclave. 173.0 g of p-dichlorobenzene (PDCB) was added to make the molar ratio PDCP:S 1.00, and the mixture was heated to 240° C., at which temperature the pre-condensation was carried out for 30 minutes. The temperature was then raised to 260° C. and the polymerization was carried out for 3 hours. After cooling, granules of polymer obtained was washed with purified water, replaced with acetone, and dried in a vacuum dryer. The weight of the polymer was 119.5 g and the inherent viscosity ( inh), an index of the molecular weight, was 0.34.

(5) LiOH production step 415.94 g (4.2 mol) of N-methyl-2-pyrrolidone and 63.585 g (1.5 mol) of lithium chloride were charged in a 500 ml separable flask made of glass and equipped with a stirring blade, and lithium chloride was dissolved at 90° C. After dissolution, 125.0 g of 48 wt % sodium hydroxide solution (corresponding to 1.5 mol of NaOH) was added. A white solid was produced instantaneously by the addition of sodium hydroxide. Water was removed while raising the temperature in a nitrogen stream.

After cooling, the dehydrated mixture was filtered through a glass filter (G4) under reduced pressure at room temperature. The residue on the filter was dried under reduced pressure at 150° C. and weighed to find that 123.5 g of the product was obtained. The molar ratio of Na:Li:Cl was confirmed to be 1.03:1.00:1.00 as a result of elementary analysis. The results of X ray diffractiometry revealed that the spectra were identical with NaCl and LiOH. Further, no lithium ion and sodium ion were detected in the supernatant (NMP layer) by the ion chromatogram. Based on these results, LiCl and NaOH were confirmed to have been converted to LiOH and NaCl at an yield of almost 100%.

Example 2

(1) Complex synthesis step 267.30 g (2.7 mol) of N-methyl-2-pyrrolidone and 173.25 g (1.5 mol) of lithium N-methylaminobutyrate (LMAB) were charged in a 500 ml separable flask made of glass and equipped with a stirring blade, and the mixture was heated to 130° C. and kept at this temperature. After confirming that LMAB was dissolved, gaseous hydrogen sulfide with a purity of 99.9% was bubbled at a rate of 500 ml/min. A sperger was installed at the tip of the injection nozzle. While bubbling hydrogen sulfide, nitrogen gas was injected to the vapor phase at a rate of 300 ml/min in order to eliminate the produced water. Effluent vapor from the separable flask was cooled with condenser. The amount of the condensed liquid was measured and the composition was analyzes by gas chromatography. The liquid consisted of 15.8 g (0.88 mol) of H$_2$O and 23.0 g (0.23 mol) of NMP.

After bubbling for 60 minutes under this condition, the amount of sulfur in the solution was quantitatively analyzed to confirm that the molar ratio of the sulfur source and LMBA was 0.65.

(2) Polymerization step

All of the complex synthesized above was transferred to a 1 l stainless steel autoclave, and 57.75 g (0.5 mol) of LMAB, 89.1 g (0.9 mol) of NMP, and 143.3 g (0.975 mol) of PDCB were added to it. The mixture was heated to 220° C. and pre-polymerization was carried out for 3 hours. After the pre-polymerization, the temperature was raised up to 260° C., at which temperature the mixture was polymerized for 3 hours.

After the polymerization, the reaction mixture was cooled. The solid obtained was washed with water, then with acetone, and dried to obtain polyarylene sulfide. The polyarylene sulfide was dissolved in α-chloronaphthalene to a concentration of 0.4 g/dl to measure the viscosity at 206° C. using Ubbelohde's viscometer. The viscosity, inh, of the polyarylene sulfide was 0.29.

Example 3

(1) Complex synthesis step

The experiment was carried out in the same manner as in Example 1 with regard to the equipment, the amounts of raw materials, and the like, provided that nitrogen injection for dehydration was omitted and, instead, the reaction for the synthesis of the complex was carried out at 180° C. so as to expel the water produced along with formation of the complex from the system. Effluent vapor from the separable flask was cooled with condenser. The amount of the condensed liquid was measured and the composition was analyzes by gas chromatography. The liquid consisted of 12.1 g (0.67 mol) of H$_2$O and 13.0 g (0.13 mol) of NMP.

After bubbling hydrogen sulfide for 60 minutes at a rate of 500 ml/min under this condition, the amount of sulfur in the solution was quantitatively analyzed to confirm that the molar ratio of the sulfur source and LMBA was 0.56.

(2) Polymerization step

All of the complex synthesized above was transferred to a 1 l stainless steel autoclave, and 25.64 g (0.22 mol) of LMAB, 39.2 g (0.40 mol) of NMP, and 123.5 g (0.84 mol) of PDCB were added to it. The mixture was heated to 220° C. and pre-polymerization was carried out for 3 hours. After the pre-polymerization, the temperature was raised up to 260° C., at which temperature the mixture was polymerized for 3 hours.

After the polymerization, the reaction mixture was cooled. The solid obtained was washed with water, then with acetone, and dried to obtain polyarylene sulfide. The polyarylene sulfide was dissolved in α-chloronaphthalene to a concentration of 0.4 g/dl to measure the viscosity at 206° C. using Ubbelohde's viscometer. The viscosity, inh, of the polyarylene sulfide was 0.25.

Comparative Example 1

(1) Complex synthesis step 267.30 g (2.7 mol) of N-methyl-2-pyrrolidone and 173.25 (1.5 mol) of lithium N-methylaminobutyrate (LMAB) were charged in a 500 ml separable flask made of glass and equipped with a stirring blade, and the mixture was heated to 130° C. and kept at this temperature. After confirming that LMAB was dissolved, gaseous hydrogen sulfide with a purity of 99.9% was bubbled at a rate of 430 ml/min. A sperger was installed at the tip of the injection nozzle. As a result of measuring the complex synthesis reaction rate, all of the injected hydrogen sulfide was confirmed to be absorbed until the sulfur concentration of the solution reaches a certain level (the molar ratio of sulfur source/ lithium N-methylaminobutyrate=0.75) at 130° C., when the feeding rate of hydrogen sulfide is 430 ml/min or smaller.

That is to say, the raw material complex was adjusted by feeding hydrogen sulfide for 39 minutes until the molar ratio of sulfur source/lithium N-methylaminobutyrate, required for the polymerization reaches 0.5. In this instance, water produced in the synthesis of the complex are not expelled outside the system due to vapor-liquid equilibrium, even when an open system is employed for the reaction vessel.

(2) Polymerization step

All of the complex synthesized above was transferred to a 1 l stainless steel autoclave, and 110.3 g (0.75 mol) of PDCB was added to it. The mixture was heated to 220° C. and pre-polymerization was carried out for 3 hours. After the pre-polymerization, the temperature was raised up to 260° C., at which temperature the mixture was polymerized for 3 hours.

After the polymerization, the reaction mixture was cooled. The solid obtained was washed with water, then with acetone, and dried to obtain polyarylene sulfide. The polyarylene sulfide was dissolved in α-chloronaphthalene to a concentration of 0.4 g/dl to measure the viscosity at 206° C. using Ubbelohde's viscometer. The viscosity, inh, of the polyarylene sulfide was 0.19.

Example 4

415.94 g (4.2 mol) of N-methyl-2-pyrrolidone and 63.585 (1.5 mol) of lithium chloride were charged in a 500 ml separable flask made of glass and equipped with a stirring blade, and lithium chloride was dissolved at 90° C. After dissolution, 125.0 g of 48 wt % sodium hydroxide solution (corresponding to 1.5 mol of NaOH) was added. A white solid was produced instantaneously by the addition of sodium hydroxide. Water was removed while raising the temperature in a nitrogen stream.

After cooling, the dehydrated mixture was filtered through a glass filter (G4) under reduced pressure at room temperature. The residue on the filter was dried under reduced pressure at 150° C. and weighed to find that 123.5 g of the product was obtained. The molar ratio of Na:Li:Cl was confirmed to be 1.03:1.00:1.00 as a result of elementary analysis. The results of X ray diffractiometry revealed that the spectra were identical with NaCl and LiOH. Further, no lithium ion and sodium ion were detected by the ion chromatogram in the supernatant (NMP layer). Based on these results, LiCl and NaOH were confirmed to have been converted to LiOH and NaCl at an yield of almost 100%.

Example 5

A large amount of white solid was produced by the addition of 168.3 g of 50 wt % potassium hydroxide solution (corresponding to 1.5 mol of KOH) instead of the 125.0 g of 48 wt % sodium hydroxide solution in Example 4. The same procedure was followed thereafter to obtain 146.1 g of a white precipitate. Almost no lithium ion and potassium ion were detected by the ion chromatogram in the supernatant (NMP layer). Further, the results of X ray diffractiometry revealed that the spectra were identical with KCl and LiOH. Based on these results, LiCl and KOH were confirmed to have been converted to LiOH and KCl at an yield of almost 100%.

Obviously, numerous modifications and variations of the present invention are possible in light of the above teachings. It is therefore to be understood that within the scope of the appended claims, the invention may be practiced otherwise than as specifically described herein.

We claim:

1. A process for manufacturing polyarylene sulfide comprising:

(a) feeding a liquid or gaseous sulfur compound to a mixture comprising lithium hydroxide and a solid selected from the group consisting of an alkaline metal chloride selected from the group consisting of sodium chloride and potassium chloride, and an alkaline earth metal chloride in a non-protic organic solvent, and directly reacting lithium hydroxide and said sulfur compound, (b) separating said solid selected from the group consisting of an alkaline metal chloride selected from the group consisting of sodium chloride and potassium chloride, and an alkaline earth metal chloride, (c) adjusting the sulfur content of the reaction mixture, (d) feeding a dihalogeno aromatic compound to effect a polycondensation reaction, and (e) feeding an alkali metal hydroxide other than lithium hydroxide or an alkaline earth metal hydroxide to the reaction mixture which contains by-produced lithium chloride and reacting lithium ion and hydroxy ion to recover lithium ion as lithium hydroxide which is the reaction product.

2. A process for manufacturing polyarylene sulfide comprising, (a) feeding a liquid or gaseous sulfur compound to a system comprising lithium hydroxide or lithium N-methylaminobutyrate in a non-protic organic solvent, (b) dehydrating the reaction mixture, and (c) adjusting the sulfur content of the reaction mixture and feeding a dihalogeno aromatic compound to effect a polycondensation reaction, wherein said dehydration is effected after the addition of said sulfur compound and before addition of said dihalogeno aromatic compound.

3. In the method of separating a solid selected from the group consisting of an alkaline metal chloride selected from the group consisting of sodium chloride and potassium chloride, and an alkaline earth metal chloride, from a mixture comprising lithium hydroxide and a solid selected from the group consisting of an alkaline metal chloride selected from the group consisting of sodium chloride and potassium chloride, and an alkaline earth metal chloride in a non-protic organic solvent, a method characterized by feeding a liquid or gaseous sulfur compound to said mixture to react lithium hydroxide directly with said sulfur compound.

4. A process for recovering lithium ion from a reaction mixture of polyarylene sulfide containing lithium chloride after removing polyarylene sulfide comprising, feeding an alkali metal hydroxide to said reaction mixture of polyarylene sulfide containing lithium chloride, reacting lithium ion and hydroxy ion, and recovering the lithium ion as lithium hydroxide which is the reaction product.

5. The process for manufacturing polyarylene sulfide according to claims 1 or 2 or the method of claim 3, wherein said liquid or sulfur compound is hydrogen sulfide.

6. The process for manufacturing polyarylene sulfide according to claims 1 or 2, wherein said dihalogeno aromatic compound contains p-dichlorobenzene at a molar concentration of 50% or more.

7. The process for manufacturing polyarylene sulfide according to claims 1 or 2 or the method of claim 3, wherein said non-protic organic solvent is N-methyl-2-pyrrolidone.

8. The process for manufacturing polyarylene sulfide according to claim 1 or the process for recovering lithium ion according to claim 4, wherein the amount of the alkali metal hydroxide or alkaline earth metal hydroxide to be added, in terms of the hydroxy ion, is 0.90–1.1 mol per 1 mol of lithium ion.

9. The process for manufacturing polyarylene sulfide according to claim 1 or the process for recovering lithium ion according to claim 4, wherein said alkali metal hydroxide or alkaline earth metal hydroxide is sodium hydroxide, potassium hydroxide, or magnesium hydroxide.

10. The process for recovering lithium ion according to claim 4, wherein the reaction temperature of said lithium ion and hydroxy ion is 0°–230° C. when the alkali metal hydroxide or alkaline earth metal hydroxide is charged as an aqueous solution, and 60°–230° C. when the same is charged as a solid.

11. A process for manufacturing polyarylene sulfide comprising:
- (a) preparing a polyarylene sulfide by reacting lithium hydroxide or lithium N-methylaminobutyrate, a sulfur compound, and a dihaloaromatic compound in a non-protic solvent;
- (b) removing said polyarylene sulfide;
- (c) feeding an alkali metal hydroxide other than lithium hydroxide or an alkaline earth metal hydroxide to reaction by-products comprising lithium chloride and reacting lithium ion and hydroxy ion to recover lithium ion as lithium hydroxide
- (d) feeding a liquid or gaseous sulfur compound to a mixture comprising lithium hydroxide and a solid selected from the group consisting of an alkaline metal chloride selected from the group consisting of sodium chloride and potassium chloride, and an alkaline earth metal chloride in a non-protic organic solvent, and directly reacting lithium hydroxide and said sulfur compound,
- (e) removing said solid selected from the group consisting of an alkaline metal chloride selected from the group consisting of sodium chloride and potassium chloride, and an alkaline earth metal chloride,
- (f) adjusting the sulfur content of the reaction mixture,
- (g) feeding a dihalogeno aromatic compound to effect a polycondensation reaction, and
- (h) returning to step (b).

* * * * *